US011209125B2

(12) United States Patent
Posselt

(10) Patent No.: US 11,209,125 B2
(45) Date of Patent: Dec. 28, 2021

(54) TRANSPORT CONTAINER

(71) Applicant: Linde Aktiengesellschaft, Munich (DE)

(72) Inventor: Heinz Posselt, Bad Aibling (DE)

(73) Assignee: Linde GmbH, Munich (DE)

( * ) Notice: Subject to any disclaimer, the term of this patent is extended or adjusted under 35 U.S.C. 154(b) by 184 days.

(21) Appl. No.: 15/893,915

(22) Filed: Feb. 12, 2018

(65) Prior Publication Data

US 2018/0231182 A1   Aug. 16, 2018

(30) Foreign Application Priority Data

Feb. 13, 2017   (EP) .................................... 17020056

(51) Int. Cl.
*F17C 3/10* (2006.01)
*F17C 3/04* (2006.01)
*F17C 13/00* (2006.01)

(52) U.S. Cl.
CPC .................. *F17C 3/04* (2013.01); *F17C 3/10* (2013.01); *F17C 13/001* (2013.01); *F17C 2201/0109* (2013.01); *F17C 2201/0114* (2013.01); *F17C 2201/035* (2013.01); *F17C 2201/054* (2013.01); *F17C 2201/056* (2013.01); *F17C 2203/032* (2013.01); *F17C 2203/0308* (2013.01);
(Continued)

(58) Field of Classification Search
CPC .... F17C 3/10; F17C 3/08; F17C 3/085; F17C 2203/0316; F17C 2227/0381; F17C 3/04; F17C 3/02; F16L 59/08; F16L 59/075; F16L 59/121; F16L 59/12; F16L 59/065; F16L 59/141
See application file for complete search history.

(56) References Cited

U.S. PATENT DOCUMENTS 2,863,297 A   12/1958   Johnston
2,871,669 A   2/1959   Mann et al.
(Continued)

FOREIGN PATENT DOCUMENTS

JP   2014119058 A  *  6/2014
WO   2005/038735 A1    4/2005

OTHER PUBLICATIONS

Machine translation of Okado.*
European Search Report dated Jul. 25, 2017 issued in corresponding EP 17020056.2 application (3 pages).

*Primary Examiner* — John F Pettitt, III
(74) *Attorney, Agent, or Firm* — Millen White Zelano & Branigan, PC; Brion P. Heaney

(57) ABSTRACT

A transport container for helium, with an inner container for receiving the helium, a coolant container for receiving a cryogenic liquid ($N_2$), an outer container, in which the inner container and the coolant container are contained, a thermal shield, in which the inner container is contained and which can be actively cooled with the aid of a liquid phase of the cryogenic liquid ($LN_2$), the thermal shield having at least one first cooling line, in which the liquid phase of the cryogenic liquid can be received for actively cooling the thermal shield, and an insulating element, which is arranged between the outer container and the thermal shield and which can be actively cooled with the aid of a gaseous phase of the cryogenic liquid ($GN_2$), the insulating element having at least one second cooling line, in which the gaseous phase of the cryogenic liquid can be received.

20 Claims, 5 Drawing Sheets

(52) U.S. Cl.
CPC ......... *F17C 2203/0312* (2013.01); *F17C 2203/0366* (2013.01); *F17C 2203/0387* (2013.01); *F17C 2203/0391* (2013.01); *F17C 2203/0629* (2013.01); *F17C 2203/0631* (2013.01); *F17C 2203/0643* (2013.01); *F17C 2203/0646* (2013.01); *F17C 2205/0352* (2013.01); *F17C 2221/011* (2013.01); *F17C 2221/012* (2013.01); *F17C 2221/014* (2013.01); *F17C 2221/017* (2013.01); *F17C 2223/0161* (2013.01); *F17C 2223/033* (2013.01); *F17C 2225/0115* (2013.01); *F17C 2227/0341* (2013.01); *F17C 2227/0381* (2013.01); *F17C 2260/012* (2013.01); *F17C 2260/033* (2013.01); *Y02E 60/32* (2013.01)

(56) References Cited

U.S. PATENT DOCUMENTS

| | | | |
|---|---|---|---|
| 3,304,728 A | | 2/1967 | De Haan |
| 3,646,775 A | * | 3/1972 | Bonnerot ............... F17C 3/085 62/216 |
| 3,782,128 A | * | 1/1974 | Hampton ............... F17C 3/08 62/45.1 |
| 5,005,362 A | | 4/1991 | Weltmer, Jr. et al. |
| 6,922,144 B2 | | 7/2005 | Bulin et al. |
| 2005/0083198 A1 | | 4/2005 | Bulin et al. |
| 2005/0167434 A1 | | 8/2005 | Reese |

\* cited by examiner

TRANSPORT CONTAINER

The invention relates to a transport container for helium.

Helium is extracted together with natural gas. It is only economically viable for large amounts of helium to be transported in a liquid or supercritical form, that is to say at a temperature of approximately 4.2 to 6 K and under a pressure of 1 to 6 bar. The liquid or supercritical helium is transported by using transport containers that are provided with sophisticated thermal insulation to avoid the pressure of the helium increasing too quickly. Such transport containers may for example be cooled with the aid of liquid nitrogen. This involves providing a thermal shield cooled with the liquid nitrogen. The thermal shield shields an inner container of the transport container. The liquid or cryogenic helium is contained in the inner container. The holding time for the liquid or cryogenic helium in the case of such transport containers is 35 to 40 days, that is to say after this time the pressure in the inner container has increased to the maximum value of 6 bar. The supply of liquid nitrogen is sufficient for approximately 35 days.

EP 1 673 745 B1 describes such a transport container for liquid helium. The transport container comprises an inner container, in which the liquid helium is contained, a thermal shield, which partially covers the inner container, a coolant container, in which a cryogenic liquid for cooling the thermal shield is contained, and an outer container, in which the inner container, the thermal shield and the coolant container are arranged.

Against this background, the problem addressed by the present invention is that of providing an improved transport container.

Accordingly, a transport container for helium is proposed. The transport container comprises an inner container for receiving the helium, a coolant container for receiving a cryogenic liquid, an outer container, in which the inner container and the coolant container are contained, a thermal shield, in which the inner container is contained and which can be actively cooled with the aid of a liquid phase of the cryogenic liquid, the thermal shield having at least one first cooling line, in which the liquid phase of the cryogenic liquid can be received for actively cooling the thermal shield, and an insulating element, which is arranged between the outer container and the thermal shield and which can be actively cooled with the aid of a gaseous phase of the cryogenic liquid, the insulating element having at least one second cooling line, in which the gaseous phase of the cryogenic liquid can be received for actively cooling the insulating element.

The fact that the insulating element provided between the thermal shield and the outer container is actively cooled with the aid of the gaseous phase of the cryogenic liquid means that the helium holding time of the transport container can be increased in comparison with known transport containers. The helium holding time is preferably over 60 days. The fact that the thermal shield is provided ensures that the inner container is only surrounded by surfaces that are at a temperature corresponding to the boiling point of the cryogenic liquid (boiling point of nitrogen at 1.3 bara: 79.5 K). As a result, there is only a small difference in temperature between the thermal shield (79.5 K) and the inner container (temperature of the helium at 1 bara to 6 bara: 4.2 to 6 K) in comparison with the surroundings of the outer container. This also increases the holding time for the liquid helium.

The inner container may also be referred to as a helium container or inner tank. The transport container may also be referred to as a helium transport container. The helium may be referred to as liquid or cryogenic helium. The helium is in particular likewise a cryogenic liquid. The transport container is in particular designed to transport the helium in a cryogenic or liquid form or in a supercritical form. In thermodynamics, the critical point is a thermodynamic state of a substance that is characterized by the densities of the liquid phase and the gas phase becoming identical. At this point, the differences between the two states of aggregation cease to exist. In a phase diagram, the point is the upper end of the vapor pressure curve. The helium is introduced into the inner container in a liquid or cryogenic form. A liquid zone with liquid helium and a gas zone with gaseous helium then form in the inner container. Therefore, after being introduced into the inner container, the helium has two phases with different states of aggregation, namely liquid and gaseous. That is to say that in the inner container there is a phase boundary between the liquid helium and the gaseous helium. After a certain time, that is to say when the pressure in the inner container increases, the helium located in the inner container becomes single-phase. The phase boundary then no longer exists and the helium is supercritical.

The cryogenic liquid or the cryogen is preferably liquid nitrogen. The cryogenic liquid may also be referred to as coolant. The cryogenic liquid may alternatively also be for example liquid hydrogen or liquid oxygen. That the thermal shield can be actively cooled or is actively cooled should be understood as meaning that the thermal shield is at least partially flowed through or flowed around by the liquid phase of the cryogenic liquid in order to cool it. In the first cooling line, the cryogenic liquid may be contained both in its gaseous phase and in its liquid phase. Similarly, for actively cooling it, the insulating element is at least partially flowed through or flowed around by the gaseous phase of the cryogenic liquid in order to cool it.

In particular, the thermal shield and the insulating element are only actively cooled in an operating state of the transport container, that is to say when the inner container is filled with helium. When the cryogenic liquid has been used up, the thermal shield and the insulating element may also be uncooled. In the active cooling of the thermal shield, the cryogenic liquid may boil and evaporate. As a result, the thermal shield is at a temperature which corresponds approximately or exactly to the boiling point of the cryogenic liquid. The boiling point of the cryogenic liquid is preferably higher than the boiling point of the liquid helium. The evaporated fractions of the cryogenic liquid are used for cooling the insulating element. The thermal shield is in particular arranged inside the outer container. Preferably, the coolant container is arranged outside the thermal shield. Preferably, the first cooling line is a component that is separate from the second cooling line. That is to say that the first cooling line does not correspond to the second cooling line. It is preferred that the insulating element fills an intermediate space provided between the thermal shield and the outer container. The insulating element may also enclose the coolant container.

Preferably, the inner container is at a temperature on the outer side that corresponds approximately or exactly to the temperature of the helium stored in the inner container. Depending on whether the helium is in a liquid or supercritical form, the temperature of the helium is 4.2 to 6 K. Preferably, a cover portion of the thermal shield completely closes off a base portion of the same at each of the end faces. The base portion of the thermal shield may have a circular or approximately circular cross section. The outer container, the inner container, the coolant container and the thermal shield may be constructed rotationally symmetrically in relation to a common axis of symmetry or center axis. The inner container and the outer container are preferably produced from high-grade steel. The inner container preferably has a tubular base portion, which is closed on both sides by curved cover portions. The inner container is fluid-tight. The outer container preferably likewise has a tubular base portion, which is closed on each of the two end faces by cover portions. The base portion of the inner container and/or the base portion of the outer container may have a circular or approximately circular cross section. The thermal shield is preferably produced from a high-purity aluminum material. The thermal shield is preferably not fluid-tight.

According to one embodiment, the transport container also comprises a phase separator for separating the liquid phase of the cryogenic liquid from the gaseous phase of the cryogenic liquid.

Preferably, the phase separator is arranged outside the outer container. Alternatively, the phase separator may also be arranged inside the outer container. With the aid of the phase separator, the gas bubbles of the cryogenic liquid forming in the first cooling line can be separated from the liquid phase of the same. The phase separator preferably comprises a float with a float body, which is coupled to a valve body. As soon as the liquid level of the liquid phase in the phase separator falls due to the gas bubbles being introduced, the valve body is lifted off from a valve seat and the gaseous phase of the cryogenic liquid is separated. As a result, the liquid phase flows into the phase separator, whereby the float body floats up again and the valve body is pressed onto the valve seat. In particular, the phase separator ensures that only evaporated, cryogenic nitrogen is delivered to the second cooling line.

According to a further embodiment, the phase separator is in fluid connection with the coolant container with the aid of the at least one first cooling line.

There can be any number of first cooling lines. Preferably, multiple first cooling lines are provided. For example, six first cooling lines may be provided. The first cooling lines are preferably inclined at an angle to a horizontal, so that gas bubbles occurring in the first cooling lines rise up of their own accord toward the phase separator. In particular, the at least one first cooling line fluidically connects the coolant container to the phase separator.

According to a further embodiment, the phase separator is arranged between the at least one first cooling line and the at least one second cooling line.

Preferably, multiple second cooling lines are provided. There can be any number of second cooling lines. It is preferred that three or five second cooling lines are provided. In particular, the second cooling lines are arranged downstream of the phase separator with respect to the coolant container. The at least one first cooling line is positioned upstream of the phase separator.

According to a further embodiment, the at least one second cooling line is in direct fluid connection with the coolant container in order for the gaseous phase of the cryogenic liquid to be received by the latter.

Preferably provided are optional second cooling lines, which are not directly connected to the phase separator but are in direct fluid connection with the coolant container. This allows what is know as blow-off gas to be removed from the coolant container for cooling the insulating element.

According to a further embodiment, the at least one second cooling line is led through the insulating element.

That is to say that the at least one second cooling line is in particular not provided on the outer or inner side of the insulating element, but is arranged inside it.

According to a further embodiment, the insulating element has multiple alternately arranged layers of a reflective film, in particular an aluminum foil, and a spacer, in particular a glass paper, the at least one second cooling line being led through between the layers.

The insulating element may be what is known as an MLI (multilayer insulation). Apart from aluminum foil or other metal foils, the reflective film may also comprise metallized plastic films. The spacer may comprise glass paper, glass fabric, glass silk, glass mesh fabric or the like. The layers of reflective film serve in this case as a reflector and as mechanical fixing for the layers of spacer that ensure the thermal damping in the event of a breakdown of the vacuum. The reflective film may be perforated and/or embossed. The insulating element preferably completely fills an intermediate space provided between the thermal shield and the outer container, so that the insulating element contacts both the thermal shield and the outer container.

The fact that the spacer is arranged between the reflective films means that the insulating element arranged between the thermal shield and the outer container can be evacuated without any problem. An undesired mechanical-thermal contact between the layers of reflective film is also reduced. This contact could disturb the temperature gradient of the layers of reflective film that is established by radiation exchange. Preferably, the layers of reflective film and spacer are applied on the thermal shield with gaps. With gaps should be understood as meaning that evacuable intermediate spaces are respectively provided between the layers of reflective film and spacer. Preferably, the layers of reflective film and spacer are introduced loosely into the intermediate space provided between the thermal shield and the outer container. Loosely means here that the layers of reflective film and spacer are not pressed, so that the embossing and perforation of the reflective film allows the insulating element, and consequently the intermediate space, to be evacuated without any problem.

According to a further embodiment, the insulating element has at least one heat conducting film, in particular a high-purity aluminum or copper foil, to which the at least one second cooling line is connected in a thermally conducting manner, the at least one heat conducting film being positioned between the layers of the reflective film and the spacer.

Preferably, any number of layers of the reflective film and the spacer are positioned between the thermal shield and the at least one heat conducting film. Furthermore, any number of layers of the reflective film and the spacer are also positioned between the at least one heat conducting film and the outer container. Preferably, the at least one second cooling line is connected to the at least one heat conducting film in a material-bonding manner. For the case where the heat conducting film is produced from an aluminum material, it is preferred that the at least one second cooling line is adhesively bonded to the heat conducting film. In the event that the at least one heat conducting film is produced from a copper material, it is preferred that the at least one second cooling line is soldered to the at least one heat conducting film. The heat conducting film may also be referred to as a heat transfer film.

According to a further embodiment, the at least one heat conducting film encloses the thermal shield.

Preferably, the at least one heat conducting film runs peripherally around the thermal shield. In an axial direction of the transport container, spacings may be provided between individual sheets of the heat conducting film. The spacings may be for example 0.1 to 1 meter. That is to say that the at least one heat conducting film does not completely encapsulate the thermal shield.

According to a further embodiment, the insulating element has multiple heat conducting films, layers of the reflective film and the spacer being arranged between the heat conducting films.

For example, three such heat conducting films are provided. There can be any number of heat conducting films. Preferably, a first heat conducting film is provided between the outer container and the thermal shield, a second heat conducting film is provided between the first heat conducting film and the thermal shield and a third heat conducting film is provided between the second heat conducting film and the thermal shield. Any number of layers of the reflective film and the spacer are provided between two adjacent heat conducting films.

According to a further embodiment, each heat conducting film is assigned a second cooling line, which is connected to the respective heat conducting film in a thermally conducting manner.

Preferably, each second cooling line is connected to the heat conducting film assigned to it in a material-bonding manner. The second cooling lines may also be connected to different heat conducting films, that is to say to multiple heat conducting films, in a thermally conducting and in particular material-bonding manner.

According to a further embodiment, the second cooling lines are in fluid connection with one another with the aid of pipe bends.

A serpentine or meandering arrangement of the second cooling lines is obtained as a result.

According to a further embodiment, a thickness of the at least one heat conducting film is greater than a thickness of the reflective film.

For example, the heat conducting film has a thickness of 0.5 to 1.5 millimeters.

According to a further embodiment, the coolant container is arranged outside the thermal shield.

Preferably, the coolant container is positioned next to the thermal shield in an axial direction of the transport container. An intermediate space is provided between the coolant container and the thermal shield. The coolant container is preferably not part of the thermal shield.

According to a further embodiment, the thermal shield has a cover portion, which is separate from the coolant container and is arranged between the inner container and the coolant container.

Preferably, the thermal shield has a tubular base portion, which is closed on both sides by the cover portions. One of the cover portions of the thermal shield is arranged between the inner container and the coolant container. The cover portion of the coolant container is in particular positioned in the intermediate space provided between the inner container and the coolant container.

Further possible implementations of the transport container also comprise combinations of features or embodiments described above or below with regard to the exemplary embodiments that have not been specified explicitly. A person skilled in the art will also add individual aspects as improvements or supplementations to the respective basic form of the transport container.

Further advantageous configurations of the transport container form the subject matter of the dependent claims and of the exemplary embodiments of the transport container described below. The transport container is explained in detail hereinafter on the basis of preferred embodiments with reference to the appended figures.

In the figures, elements that are identical or have the same function have been given the same reference signs, unless stated otherwise.

Figure 1:
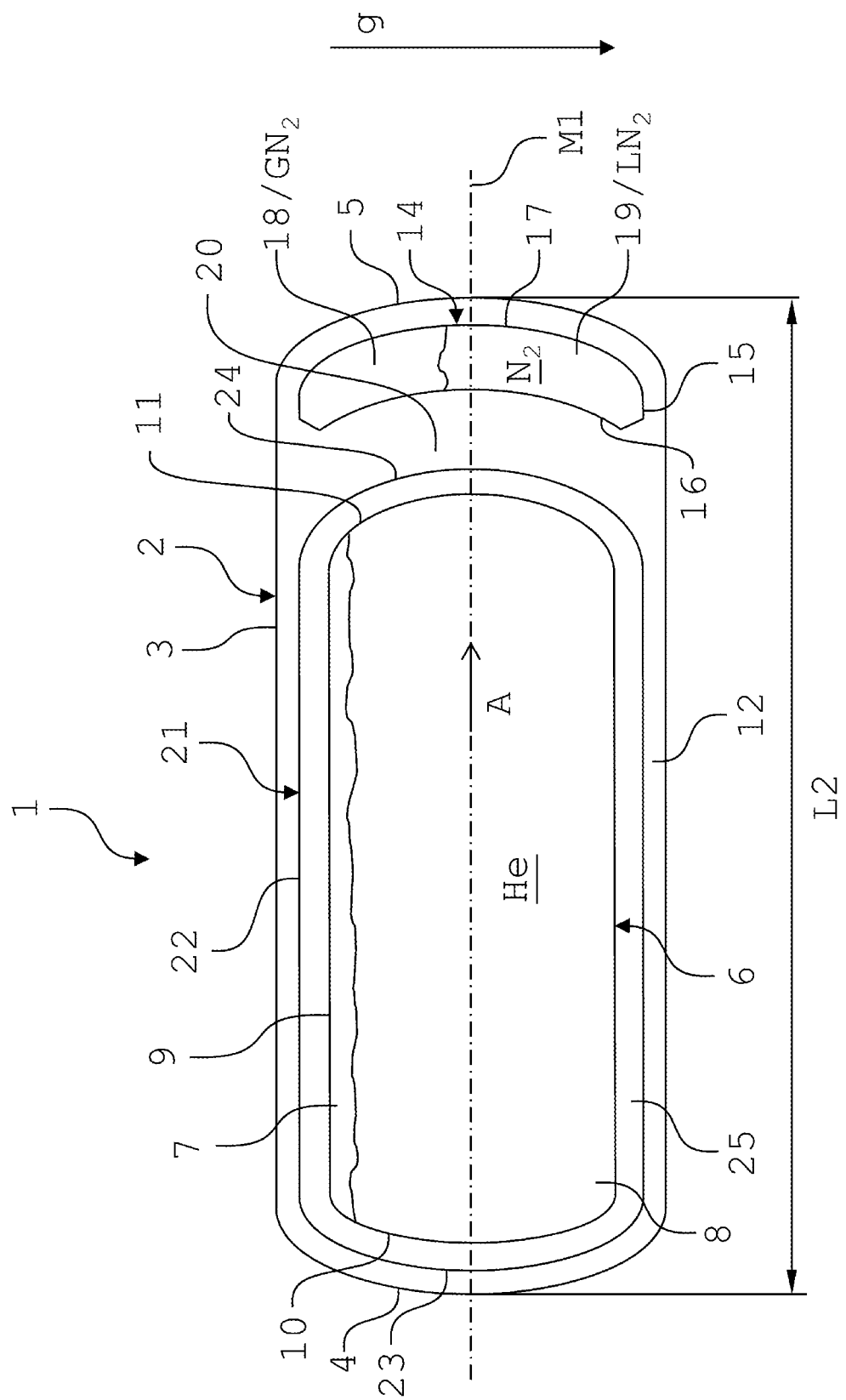
FIG. 1 shows a schematic view of one embodiment of a transport container.
Figure 2:
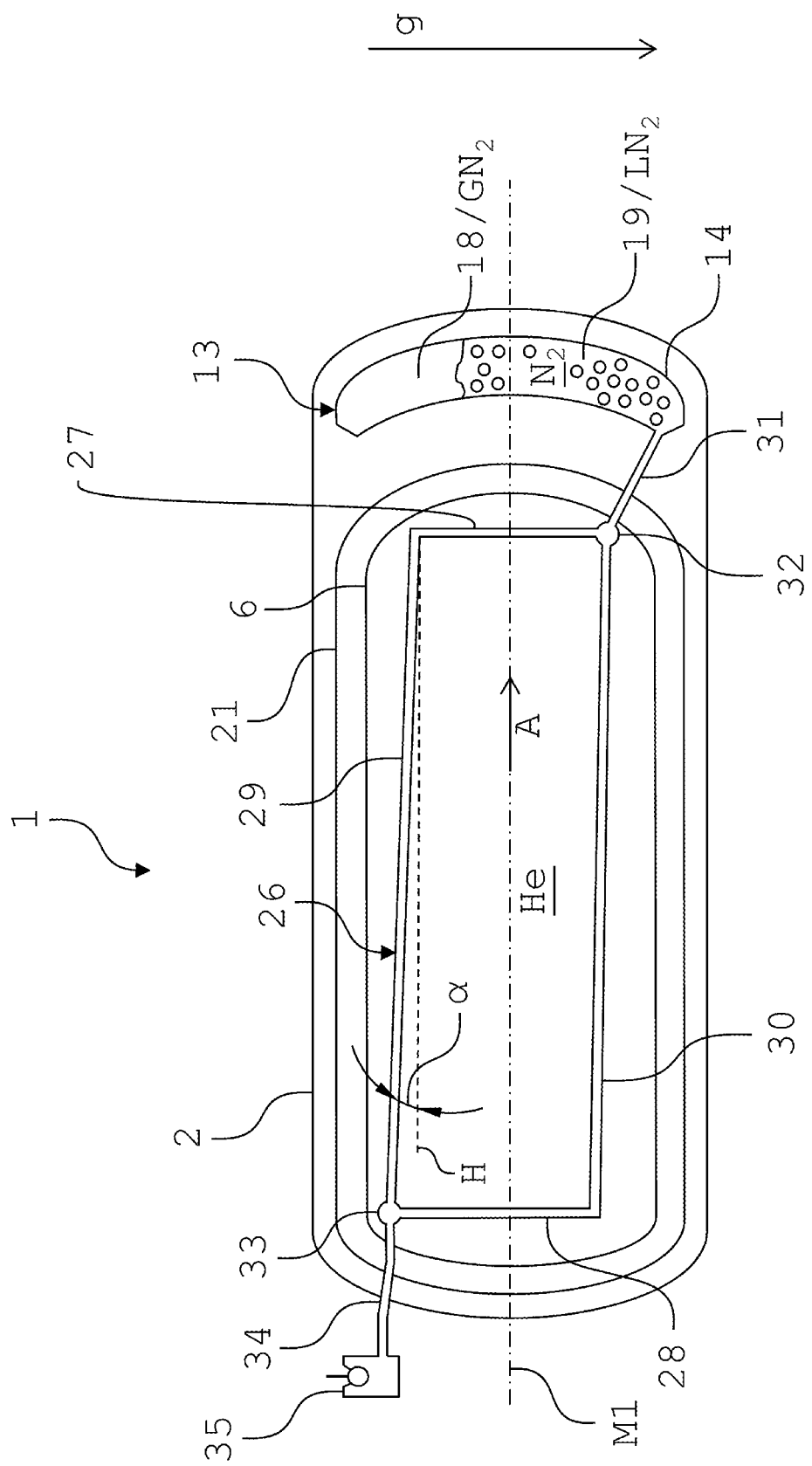
FIG. 2 shows a further schematic view of the transport container according to FIG. 1.
Figure 3:
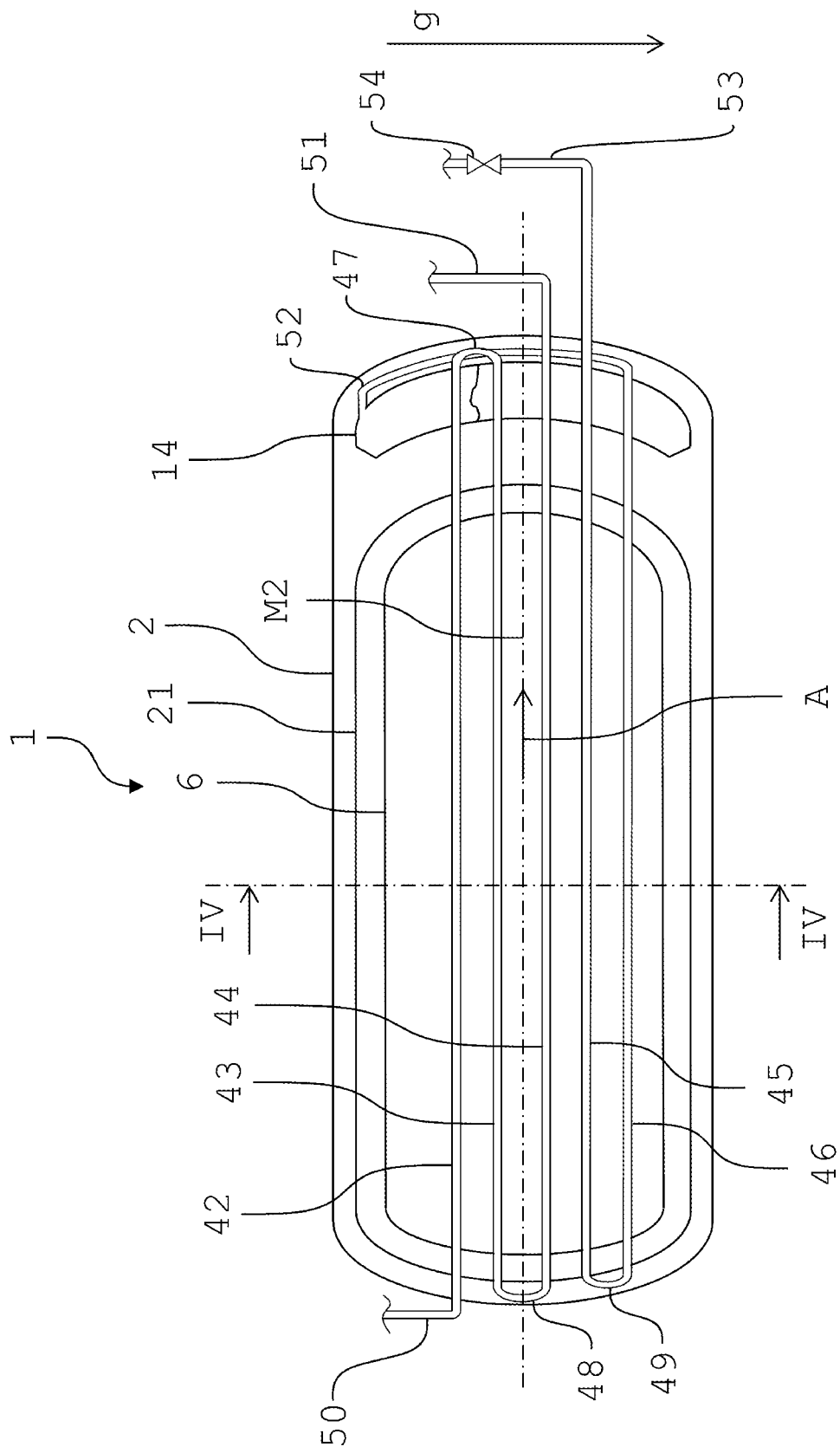
FIG. 3 shows a further schematic view of the transport container according to FIG. 1.

FIG. 1 shows a greatly simplified schematic view of one embodiment of a transport container 1 for liquid helium He. FIGS. 2 and 3 show further schematic views of the transport container 1. In the following, reference is at the same time made to FIGS. 1 to 3.

The transport container 1 may also be referred to as a helium transport container. The transport container 1 may also be used for other cryogenic liquids. Examples of cryogenic liquids, or cryogens for short, are the previously mentioned liquid helium He (boiling point at 1 bara: 4.222 K=−268.929° C.), liquid hydrogen $H_2$ (boiling point at 1 bara: 20.268 K=−252.882° C.), liquid nitrogen $N_2$ (boiling point at 1 bara: 7.35 K=−195.80° C.) or liquid oxygen $O_2$ (boiling point at 1 bara: 90.18 K=−182.97° C.).

The transport container 1 comprises an outer container 2. The outer container 2 is produced for example from high-grade steel. The outer container 2 may have a length L2 of for example 10 meters. The outer container 2 comprises a tubular or cylindrical base portion 3, which is closed at each of both the end faces with the aid of a cover portion 4, 5, in particular with the aid of a first cover portion 4 and a second cover portion 5. The base portion 3 may have a circular or approximately circular geometry in cross section. The cover portions 4, 5 are curved. The cover portions 4, 5 are oppositely curved, so that both cover portions 4, 5 are outwardly curved with respect to the base portion 3. The outer container 2 is fluid-tight, in particular gas-tight. The outer container 2 has an axis of symmetry or center axis M1, in relation to which the outer container 2 is constructed rotationally symmetrically.

The transport container 1 also comprises an inner container 6 for receiving the helium He. The inner container 6 is likewise produced for example from high-grade steel. As long as the helium He is in the two-phase region, a gas zone 7 with evaporated helium He and a liquid zone 8 with liquid helium He may be provided in the inner container 6. The inner container 6 is fluid-tight, in particular gas-tight, and may comprise a blow-off valve for controlled pressure reduction. Like the outer container 2, the inner container 6 comprises a tubular or cylindrical base portion 9, which is closed on both end faces by cover portions 10, 11, in particular a first cover portion 10 and a second cover portion 11. The base portion 9 may have a circular or approximately circular geometry in cross section.

The transport container 1 also comprises a cooling system 13 (FIG. 2) with a coolant container 14. The inner container 6 is completely enclosed by the outer container 2. Like the outer container 2, the inner container 6 is formed rotationally symmetrically in relation to the center axis M1. A gap or intermediate space 12 provided between the inner container 6, the coolant container 14 and the outer container 2 is evacuated. In the intermediate space 12 there may be arranged an insulating element which is not shown in FIGS. 1 to 3 and fills the intermediate space 12. The intermediate space 12 completely encloses the inner container 6 and the coolant container 14.

A cryogenic liquid, such as for example nitrogen $N_2$, is contained in the coolant container 14. The coolant container 14 comprises a tubular or cylindrical base portion 15, which may be constructed rotationally symmetrically in relation to the center axis M1. The base portion 15 may have a circular or approximately circular geometry in cross section. The base portion 15 is closed at each of the end faces by a cover portion 16, 17, in particular by a first cover portion 16 and a second cover portion 17. The cover portions 16, 17 may be curved. In particular, the cover portions 16, 17 are curved in the same direction. The coolant container 14 may also have a different construction. The coolant container 14 is arranged outside the inner container 6, but inside the outer container 2.

A gas zone 18 with evaporated or gaseous nitrogen $GN_2$ and a liquid zone 19 with liquid nitrogen $LN_2$ may be provided in the coolant container 14. The coolant container 14 is arranged next to the inner container 6 when viewed in an axial direction A of the inner container 6. The axial direction A is positioned parallel to the center axis M1. The axial direction A may be oriented from the first cover portion 4 of the outer container 2 in the direction of the second cover portion 5 of the outer container 2. A gap or intermediate space 20, which may be part of the intermediate space 12, is provided between the inner container 6, in particular between the second cover portion 11 of the inner container 6, and the coolant container 14, in particular the first cover portion 16 of the coolant container 14. That is to say that the intermediate space 20 is likewise evacuated.

The transport container 1 also comprises a thermal shield 21 assigned to the cooling system 13. The thermal shield 21 is arranged in the evacuated intermediate space 12 provided between the inner container 6 and the outer container 2. The thermal shield 21 can be actively cooled or is actively cooled with the aid of the liquid nitrogen $LN_2$. Active cooling should be understood in the present case as meaning that, for cooling the thermal shield 21, the liquid nitrogen $LN_2$ is passed through the latter or along it. The thermal shield 21 is thereby cooled to a temperature that corresponds approximately to the boiling point of the nitrogen $N_2$.

The thermal shield 21 comprises a cylindrical or tubular base portion 22, which is closed on both sides by a cover portion 23, 24 closing it off at the end face, in particular a first cover portion 23 and a second cover portion 24. Both the base portion 22 and the cover portions 23, 24 are actively cooled with the aid of the nitrogen $N_2$. The base portion 22 may have a circular or approximately circular geometry in cross section. The thermal shield 21 is preferably likewise constructed rotationally symmetrically in relation to the center axis M1. The second cover portion 24 of the thermal shield 21 is arranged between the inner container 6, in particular the second cover portion 11 of the inner container 6, and the coolant container 14, in particular the first cover portion 16 of the coolant container 14.

The second cover portion 24 of the thermal shield 21 is a component that is separate from the coolant container 14. That is to say that the first cover portion 23 is not part of the coolant container 14. When viewed in the axial direction A, the second cover portion 24 of the thermal shield 21 is arranged between the inner container 6, in particular the second cover portion 11 of the inner container 6, and the coolant container 14, in particular the first cover portion 16 of the coolant container 14. The intermediate space 12 completely encloses the thermal shield 21.

The first cover portion 23 of the thermal shield 21 is facing away from the coolant container 14. The first cover portion 23 of the thermal shield 21 is arranged between the first cover portion 4 of the outer container 2 and the first cover portion 10 of the inner container 6. The thermal shield 21 is in this case self-supporting. That is to say that the thermal shield 21 is not supported on either the inner container 6 or the outer container 2. For this purpose, the thermal shield 21 may be provided with a carrying ring, which is suspended from the outer container 2 by supporting bars, in particular tension bars. The inner container 6 may also be suspended from the carrying ring by further supporting bars, in particular tension bars. The heat input through the mechanical supporting bars is partially realized by the carrying ring. The carrying ring has pockets, which allow the supporting bars to be of the greatest possible thermal length. The coolant container 14 may comprise bushings for the mechanical supporting bars.

The thermal shield 21 is fluid-permeable. That is to say that a gap or intermediate space 25 between the inner container 6 and the thermal shield 21 is in fluid connection with the intermediate space 12. As a result, the intermediate spaces 12, 25 can be evacuated at the same time. The intermediate space 25 completely encloses the inner container 6. A further insulating element that is not shown in FIGS. 1 to 3 may be arranged in the intermediate space 25. Bores, apertures or the like may be provided in the thermal shield 21, in order to allow evacuation of the intermediate spaces 12, 25. The thermal shield 21 is preferably produced from a high-purity aluminum material.

The second cover portion 24 of the thermal shield 21 shields the cooling container 14 completely from the inner container 6. That is to say that, when looking in the direction from the inner container 6 toward the coolant container 14, that is to say when looking in the axial direction A, the coolant container 14 is completely covered by the second cover portion 24 of the thermal shield 21. In particular, the thermal shield 21 in this case completely encloses the inner container 6. That is to say that the inner container 6 is arranged completely inside the thermal shield 21, while, as already mentioned above, the thermal shield 21 is not fluid-tight.

As FIG. 2 also shows, the thermal shield 21 comprises at least one first cooling line 26 for actively cooling it. The first cooling line 26 is assigned to the cooling system 13. Preferably, multiple such first cooling lines 26 are provided, for example six such first cooling lines 26. However, there can be any number of first cooling lines 26. The first cooling line 26 may comprise two vertical portions 27, 28, running in a direction of gravitational force g, and two sloping portions 29, 30. The vertical portions 27, 28 may be provided on the cover portions 23, 24 and/or on the base portion 22 of the thermal shield 21. The sloping portions 29, 30 may likewise be provided on the cover portions 23, 24 and/or on the base portion 22.

The first cooling line 26 is connected to the thermal shield 21 in a material-bonding manner. In the case of material-bonding connections, the parts being connected are held together by atomic or molecular forces. Material-bonding connections are non-releasable connections, which can only be separated by destroying the connecting means or the parts being connected. Material-bonding connections can be produced for example by adhesive bonding, soldering, welding or vulcanizing. Preferably, the first cooling line 26 or the first cooling lines 26 is/are welded, soldered or adhesively bonded to the thermal shield 21.

The first cooling line 26 is in fluid connection with the coolant container 14 by way of a connection line 31, so that the liquid nitrogen $LN_2$ is forced from the coolant container 14 into the first cooling line 26. The connection line 31 opens out into a distributor 32, from which the portion 27 and the portion 30 branch off. The portion 29 and the portion 28 meet at a manifold 33, from which a connection line 34 leads to a phase separator 35 arranged outside the outer container 2. The phase separator 35 may also be positioned inside the outer container 2. The phase separator 35 is designed to separate gaseous nitrogen $GN_2$ from liquid nitrogen $LN_2$. With the aid of the phase separator 35, the gaseous nitrogen $GN_2$ may also be removed from the first cooling line 26.

As mentioned above, the first cooling line 26 or the first cooling lines 26 is/are provided both on the base portion 22 and on the cover portions 23, 24 of the thermal shield 21. Alternatively, the cover portions 23, 24 are connected to the base portion 22 as one part in terms of the material, in particular in a material-bonding manner. For example, the cover portions 23, 24 are welded to the base portion 22. The fact that the cover portions 23, 24 are connected to the base portion 22 as one part in terms of the material, that is to say in a material-bonding manner, means that the cooling of the cover portions 23, 24 can take place by heat conduction.

The first cooling line 26, and in particular the sloping portions 29, 30 of the first cooling line 26, has/have a gradient with respect to a horizontal H, which is arranged perpendicularly to the direction of gravitational force g. In particular, the portions 29, 30 form an angle α of greater than 3° with the horizontal H. The angle α may be 3 to 15° or even more. In particular, the angle α may also be exactly 3°. In particular, the portions 29, 30 have a positive gradient in the direction of the phase separator 35, so that gas bubbles rise up to the phase separator 35.

Figure 4:
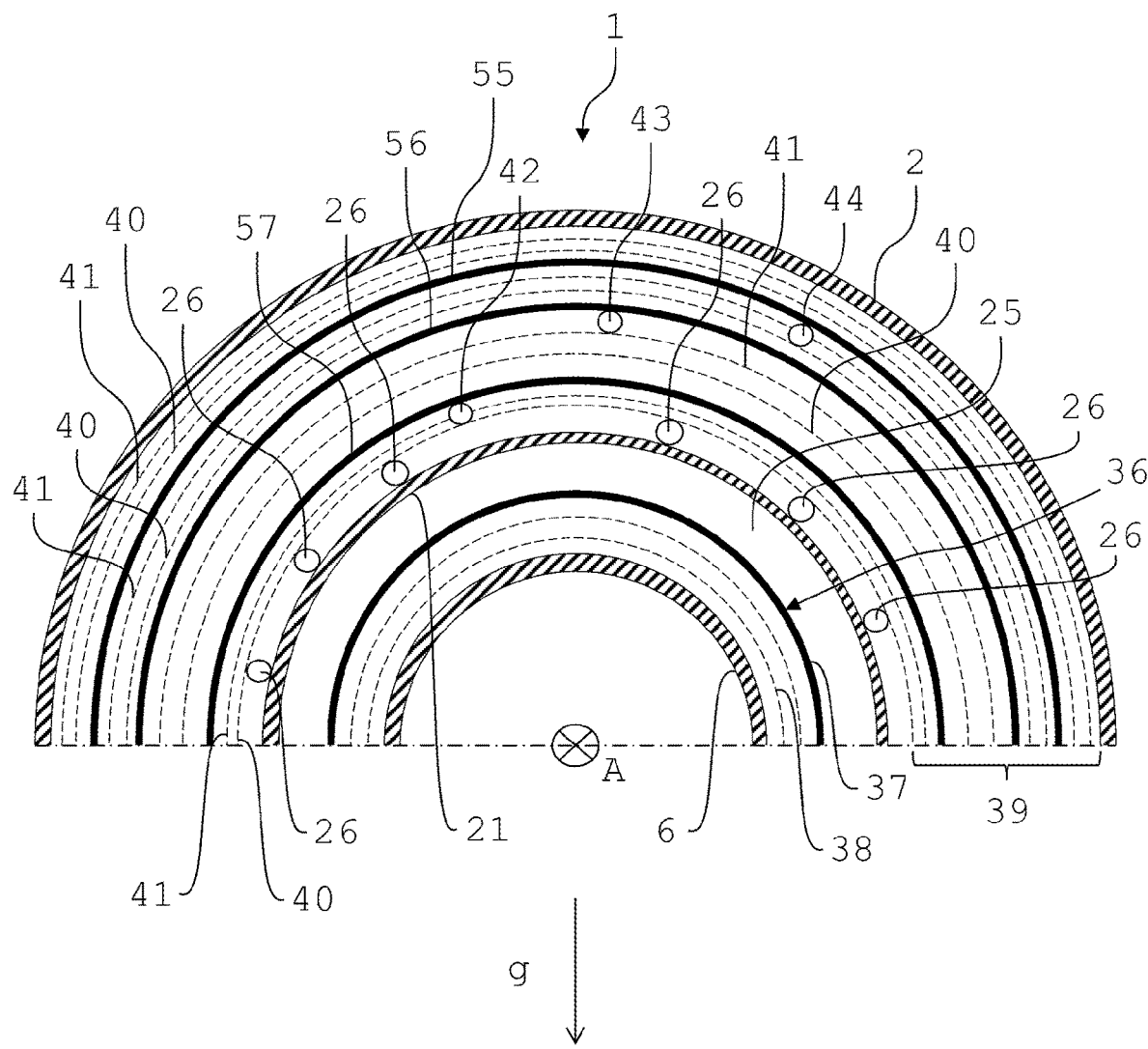
FIG. 4 shows a sectional view of the transport container according to the sectional line IV-IV of FIG. 3.

The inner container 6 comprises an insulating element 36 that is shown in FIG. 4. The insulating element 36 completely encloses the inner container 6, that is to say that the insulating element 36 is provided both on the base portion 9 and on the cover portions 10, 11 of the inner container 6. The insulating element 36 encapsulates the inner container 6. The insulating element 36 is arranged between the inner container 6 and the thermal shield 21, in the intermediate space 25, and partially fills the latter. The insulating element 36 has a highly reflective copper layer 37 on the outer side, that is to say facing the thermal shield 21. The copper layer 37 is metallically bright. That is to say that the copper layer 37 does not have a surface coating or oxide layer. The copper layer 37 may be for example a copper foil or an aluminum foil with a vapor-deposited copper coating.

The actual thermal damping of the inner container 6 with respect to the temperature level of the liquid nitrogen $LN_2$ of the thermal shield 21 is provided by the copper layer 37. Preferably, the copper layer 37 is a smooth film of high-purity bright copper, which is drawn tightly and without creases around a multilayer insulating layer 38 arranged between the copper layer 37 and the inner container 6. The insulating layer 38 comprises multiple alternately arranged layers of a reflective film and a spacer. The reflective film may be a perforated and embossed aluminum foil or a metallized plastic film. The spacer may for example comprise glass paper or glass fabric. The reflective film serves as a reflector and the spacer keeps the layers of reflective film spaced apart from one another and serves as damping in the event of a breakdown of the vacuum between the reflective films.

The insulating layer 38 may for example comprise ten layers. The layers of reflective film and spacer are applied on the inner container 6 without any gaps, that is to say are pressed. The insulating layer 38 may be what is known as an MLI (multilayer insulation). On the outer side, that is to say facing the thermal shield 21, the inner container 6 and also the insulating element 36 are approximately at a temperature corresponding to the boiling point of the helium He. During the mounting of the insulating layer 38, it is ensured that the layers of reflective film and spacer have the greatest possible mechanical pressing, to achieve the effect that all of the layers of the insulating layer 38 are as isothermal as possible. The insulating element 36 may be referred to as the first insulating element 36.

Provided between the insulating element 36 and the thermal shield 21 is the intermediate space 25, running completely around the inner container 6. The intermediate space 25 is also provided between the insulating element 36 and the cover portions 23, 24 of the thermal shield 21. The intermediate space 25 has a gap width which is preferably 5 to 15 millimeters, more preferably 10 millimeters. With the aid of the intermediate space 25, the thermal shield 21 is arranged peripherally spaced apart from the copper layer 37 of the insulating element 36 of the inner container 6 and is not in contact with it. As a result, the heat input by radiation is reduced to the minimum physically possible. Heat is only transferred from the surfaces of the inner container 6 to the thermal shield 21 by radiation and residual gas conduction.

A further, in particular a second, insulating element 39 is provided between the thermal shield 21 and the outer container 2, that is to say in the intermediate space 12. The insulating element 39 preferably completely fills the intermediate space 12 in the region of the inner container 6, so that there the insulating element 39 contacts the thermal shield 21 on the outer side and the outer container 2 on the inner side. The insulating element 39 encloses the thermal shield 21 apart from its second cover portion 24, that is to say it encloses the first cover portion 23 and the base portion 22. Furthermore, the cylindrical base portion 15 and the second cover portion 17 of the coolant container 14 are enclosed by the insulating element 39. The insulating element 39 is preferably likewise a so-called MLI.

The insulating element 39 is provided both between the respective base portions 3, 15, 22 of the outer container 2, of the coolant container 14 and of the thermal shield 21 and between the first cover portion 23 of the thermal shield 21 and the first cover portion 4 of the outer container 2 and also between the second cover portion 17 of the coolant container 14 and the second cover portion 5 of the outer container 2. The insulating element 39 may consequently also enclose the coolant container 14. The insulating element 39 comprises alternately arranged layers of a reflective film 40, in particular an aluminum foil or metallized plastic film, and a spacer 41, in particular glass paper. There can be any number of layers. Apart from glass paper, the spacer 41 may also comprise glass silk, glass mesh fabric or the like.

As a difference from the insulating element 36 described above of the inner container 6, the layers of reflective film 40 and spacer 41 are introduced loosely into the intermediate space 12. Loosely means here that the layers of reflective film 40 and spacer 41 are not pressed, so that an embossing and perforation of the reflective film 40 allows the insulating element 39, and consequently the intermediate space 12, to be evacuated without any problem.

The insulating element 39 comprises at least one second cooling line 42 to 46, with the aid of which the insulating element 39 can be actively cooled with the gaseous nitrogen $GN_2$. Active cooling should be understood in the present case as meaning that, for cooling the insulating element 39, the gaseous nitrogen $GN_2$ is passed through the latter or along it. There can be any number of second cooling lines 42 to 46. For example, as shown in FIG. 3, five such second cooling lines 42 to 46 may be provided. It is also possible for three second cooling lines 42 to 46 to be provided. The second cooling lines 42 to 46 are in fluid connection with one another with the aid of pipe bends 47 to 49. The second cooling lines 42 to 46 may be arranged such that they run around both the base portion 22 and the first cover portion 23 of the thermal shield 21. The second cooling lines 42 to 46 may also run around the coolant container 14. The second cooling lines 42 to 46 are assigned to the cooling system 13.

Preferably, the second cooling line 42 is in fluid connection with the phase separator 35 with the aid of a feed line 50. The feed line 50 is used to feed the gaseous nitrogen $GN_2$, which has been separated from the liquid nitrogen $LN_2$ with the aid of the phase separator 35, to the second cooling lines 42 to 44. A discharge line 51 can be used to send the heated gaseous nitrogen $GN_2$ to the surroundings. The phase separator 35 is in fluid connection with the coolant container 14 with the aid of the first cooling line 26. In this case, the phase separator 35 is arranged between the first cooling line 26 and the second cooling line 42.

Optionally, a number of second cooling lines 45, 46 may be connected directly to the coolant container 14. In this case, the phase separator 35 is not arranged upstream of the second cooling lines 45, 46. This allows what is known as boil-off gas of the coolant container 14, that is to say gaseous nitrogen $GN_2$, to be fed to the second cooling lines 45, 46 by way of a feed line 52. Provided on a discharge line 53 of the second cooling lines 45, 46 to the surroundings is a pressure-maintaining valve 54 of the coolant container 14, which gives off the heated gaseous nitrogen GN2 to the surroundings.

As shown in FIG. 4, the second cooling lines 42 to 46 are led through the insulating element 39. The insulating element 39 has in addition to the layers of reflective film 40 and spacer 41 a multiplicity of heat conducting films 55 to 57. There can be any number of heat conducting films 55 to 57. The heat conducting films 55 to 57 are preferably formed as high-purity aluminum or copper foils. The heat conducting films 55 to 57 run around the thermal shield 21. In particular, the thermal shield 21 is arranged within a third heat conducting film 57, the third heat conducting film 57 is arranged within a second heat conducting film 56 and the second heat conducting film 56 is arranged within a first heat conducting film 55.

Layers of the reflective film 40 and the spacer 41 are respectively arranged between the heat conducting films 55 to 57. For example, four layers of reflective film 40 and spacer 41 are provided between the thermal shield 21 and the third heat conducting film 57. Furthermore, for example, ten layers of reflective film 40 and spacer 41 may be provided between the third heat conducting film 57 and the second heat conducting film 56. Twelve layers of reflective film 40 and spacer 41 may be provided between the second heat conducting film 56 and the first heat conducting film 55 and, for example, fourteen layers of reflective film 40 and spacer 41 may be provided between the first heat conducting film 55 and the outer container 2. There can however be any number of layers in each case.

Preferably, each second cooling line 42 to 46 is assigned such a heat conducting film 55 to 57. For example, the second cooling line 42 is assigned the third heat conducting film 57, the second cooling line 43 is assigned the second heat conducting film 56 and the second cooling line 44 is assigned the first heat conducting film 55. Furthermore, the optional second cooling lines 45, 46 may also be assigned such heat conducting films 55 to 57. The heat conducting films 55 to 57 preferably have in each case a greater thickness than the reflective films 40. For example, the heat conducting films 55 to 57 have in each case a thickness of 0.5 to 1.5 millimeters. The thickness of the heat conducting films 55 to 57 may vary along the second cooling lines 42 to 46.

Preferably, the second cooling lines 42 to 46 are connected to the heat conducting films 55 to 57 assigned to them in a material-bonding manner. For example, the second cooling lines 42 to 46 are adhesively bonded to the respective heat conducting film 55 to 57. For the case where the heat conducting films 55 to 57 are produced from copper, the second cooling lines 42 to 46 are soldered to them. For the case where the heat conducting films 55 to 57 are produced from aluminum, the second cooling lines 42 to 46 are adhesively bonded to them. In this way, a good heat transfer between the respective second cooling line 42 to 46 and the heat conducting film 55 to 57 assigned to it is ensured.

Figure 5:
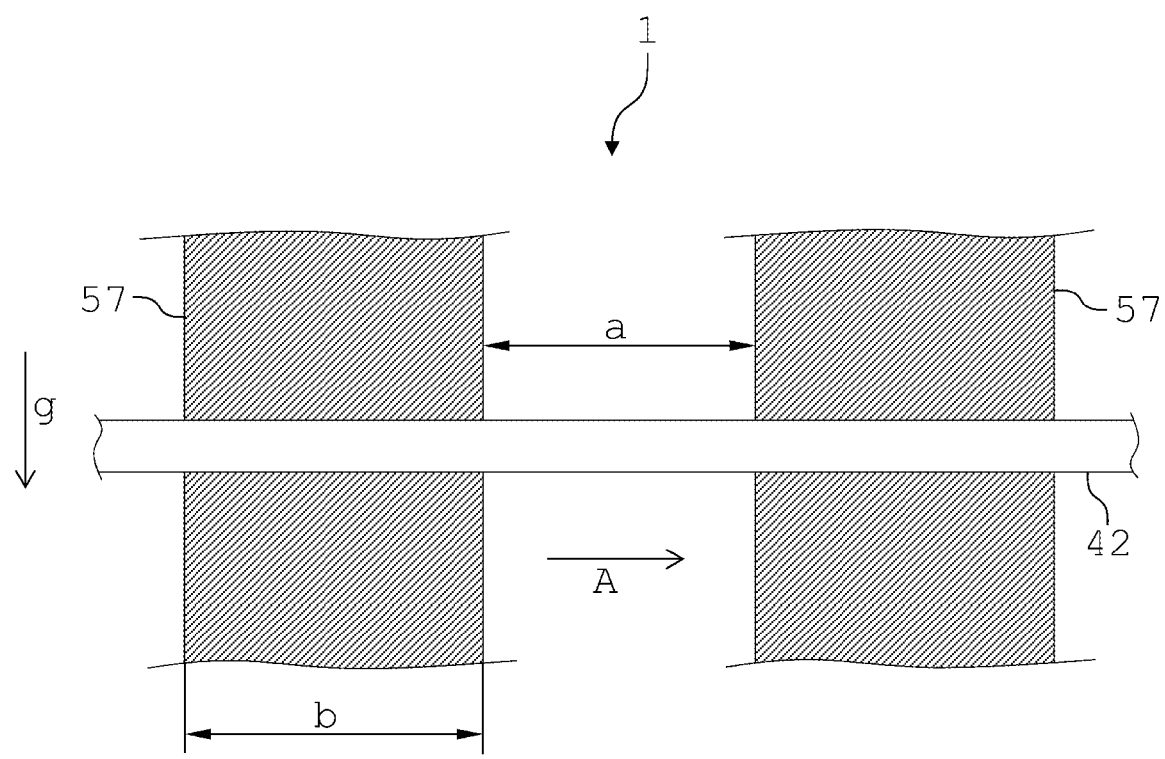
FIG. 5 shows a schematic view of a detail of the transport container according to FIG. 1.

As shown in a view of a detail in FIG. 5, the heat conducting films 55 to 57 take the form of sheets and have a width b of, for example, 1 meter. As viewed in the axial direction A, a spacing a is respectively provided between two adjacent third heat conducting films 57 or first or second heat conducting films 55, 56. That is to say that the heat conducting films 55 to 57 are arranged spaced apart from one another in the axial direction A and run peripherally around the thermal shield 21. The sheets of the heat conducting films 55 to 57 may also in each case overlap one another. The spacing a may be for example 0.1 to 1 meter. The heat conducting films 55 to 57 are wrapped peripherally around the thermal shield 21 while incorporated in the insulating element 39.

The functioning mode of the transport container 1 will be explained below. Before the filling of the inner container 6 with helium He, first the thermal shield 21 is cooled down with the aid of cryogenic, initially gaseous and later liquid, nitrogen $N_2$ at least almost or right up to the boiling point (1.3 bara, 7.95 K) of the liquid nitrogen $LN_2$. The inner container 6 is in this case not yet actively cooled. During the cooling down of the thermal shield 21, the residual vacuum gas still located in the intermediate spaces 12, 20, 25 is frozen out on the thermal shield 21. In this way it can be prevented when filling the inner container 6 with the helium He that the residual vacuum gas freezes out on the outer side of the inner container 6 and thereby contaminates the metallically bright surface of the copper layer 37 of the insulating element 36 of the inner container 6. As soon as the thermal shield 21 and the coolant container 14 have cooled down completely and the coolant container 14 is again completely filled with nitrogen $N_2$, the inner container 6 is filled with the helium He.

The transport container may then be transferred onto a transporting vehicle, such as for example a truck or a ship, for transporting the helium He. This involves cooling the thermal shield 21 continuously with the aid of the liquid nitrogen $LN_2$. The liquid nitrogen $LN_2$ is thereby used and boils in the first cooling line 26 or in the first cooling lines 26. Gas bubbles produced in the process are fed to the phase separator 35 arranged highest in the cooling system 13 with respect to the direction of gravitational force g. As soon as the gaseous nitrogen $GN_2$ has been removed from the cooling system 13 with the aid of the phase separator 35, liquid nitrogen $LN_2$ flows into the phase separator 35. The gaseous nitrogen $GN_2$ is fed to the second cooling lines 42 to 44 by way of the feed line 50. In addition, gaseous nitrogen $GN_2$ may be fed to the second cooling lines 45, 46 directly from the coolant container 14.

The fact that the thermal shield 21 is also arranged between the coolant container 14 and the inner container 6 means that it can be reliably ensured that the inner container 6 is sufficiently cooled even when there is a falling filling level or liquid level of nitrogen $N_2$ in the coolant container 14. The fact that the inner container 6 is completely surrounded by the thermal shield 21 means that it is ensured that the inner container 6 is only surrounded by surfaces that are at a temperature corresponding to the boiling point (1.3 bara, 79.5 K) of nitrogen $N_2$. In this way, there is only a small difference in temperature between the thermal shield 21 (79.5 K) and the inner container 6 (4.2 to 6 K). This extends the holding time for the helium He.

Furthermore, the fact that the insulating element 39 arranged between the thermal shield 21 and the outer container 2 is actively cooled with the aid of the gaseous nitrogen $GN_2$ means that the holding time for the helium He can be extended further. In comparison with known transport containers, the holding time for the helium He can consequently be extended significantly. Heat is in this case only transferred from the inner container 6 to the thermal shield 21 by radiation and residual gas conduction. The transport container 1 has in particular a holding time for the helium He of over 60 days, there also being no restrictions on the natural surrounding temperature.

Although the present invention has been described using exemplary embodiments, it can be modified in various ways.

REFERENCE SYMBOLS USED

1 Transport container
2 Outer container
3 Base portion
4 Cover portion
5 Cover portion
6 Inner container
7 Gas zone
8 Liquid zone
9 Base portion
10 Cover portion
11 Cover portion
12 Intermediate space
13 Cooling system
14 Coolant container
15 Base portion
16 Cover portion
17 Cover portion
18 Gas zone
19 Liquid zone
20 Intermediate space
21 Thermal shield
22 Base portion
23 Cover portion
24 Cover portion
25 Intermediate space
26 Cooling line
27 Portion
28 Portion
29 Portion
30 Portion
31 Connection line
32 Distributor
33 Manifold
34 Connection line
35 Phase separator
36 Insulating element
37 Copper layer
38 Insulating layer
39 Insulating element
40 Reflective film
41 Spacer
42 Cooling line
43 Cooling line
44 Cooling line
45 Cooling line
46 Cooling line
47 Pipe bend
48 Pipe bend
49 Pipe bend
50 Feed line
51 Discharge line
52 Feed line
53 Discharge line
54 Pressure-maintaining valve
55 Heat conducting film
56 Heat conducting film
57 Heat conducting film
a Spacing
A Axial direction
b Width
g Direction of gravitational force
$GN_2$ Nitrogen
H Horizontal
He Helium
$LN_2$ Nitrogen
L2 Length
$N_2$ Nitrogen
M1 Center axis
α Angle

The invention claimed is:

1. A transport container for helium comprising:
an inner container for receiving the helium,
a coolant container for receiving a cryogenic liquid,
an outer container, wherein the inner container and the coolant container are contained within said outer container,
a thermal shield, wherein the inner container is contained within said thermal shield, and said thermal shield can be cooled by a liquid phase of the cryogenic liquid from the coolant container, the thermal shield having at least one first cooling line which receives the liquid phase of the cryogenic liquid from the coolant container, and
an insulating element arranged between the outer container and the thermal shield, wherein said insulating element can be cooled by a gaseous phase of the cryogenic liquid, the insulating element having at least one second cooling line which receives the gaseous phase of the cryogenic liquid,
wherein the transport container further comprises a phase separator which separates the liquid phase of the cryogenic liquid from the gaseous phase of the cryogenic liquid, and said phase separator is arranged between said at least one first cooling line and said at least one second cooling line.

2. The transport container according to claim 1, wherein said at least one second cooling line receives the gaseous phase of the cryogenic liquid directly from said phase separator.

3. The transport container according to claim 1, wherein the at least one second cooling line is led through the insulating element.

4. The transport container according to claim 3, wherein the insulating element comprises multiple alternately arranged layers of a reflective film and a spacer and the at least one second cooling line is led through between the layers.

5. The transport container according to claim 4, wherein the insulating element has at least one heat conducting film to which the at least one second cooling line is connected in a thermally conducting manner, and the at least one heat conducting film is positioned between the layers of the reflective film and the spacer.

6. The transport container according to claim 5, wherein the at least one heat conducting film encloses the thermal shield.

7. The transport container according to claim 5, wherein the insulating element has multiple heat conducting films, and the layers of the reflective film and the spacer are arranged between the heat conducting films.

8. The transport container according to claim 7, wherein said transport container has a plurality of the second cooling lines, and each of the heat conducting film is assigned one of said second cooling lines and each of the heat conducting film is connected to the second cooling line assigned thereto in a thermally conducting manner.

9. The transport container according to claim 8, wherein the second cooling lines are in fluid connection with one another via pipe bends.

10. The transport container according to claim 5, wherein a thickness of the at least one heat conducting film is greater than a thickness of the reflective film.

11. The transport container according to claim 1, wherein the coolant container is arranged outside the thermal shield.

12. The transport container according to claim 11, wherein the thermal shield has a cover portion which is separate from the coolant container and is arranged between the inner container and the coolant container.

13. The transport container according to claim 4, wherein the reflective film is an aluminum foil and the spacer is glass paper.

14. The transport container according to claim 5, wherein the at least one heat conducting film is an aluminum or copper foil.

15. The transport container according to claim 13, wherein the at least one heat conducting film is copper foil.

16. The transport container according to claim 1, wherein the thermal shield comprises a cylindrical base portion having two ends which is closed at each end thereof by a cover portion, and one of the cover portions of said thermal shield is arranged between the inner container and the coolant container.

17. The transport container according to claim 1, wherein the thermal shield is spaced from the inner container to provide a first intermediate space, and the thermal shield is spaced from the outer container to provide a second intermediate space, and said thermal shield is fluid permeable so that said first intermediate space is in fluid communication with said second intermediate space.

18. The transport container according to claim 16, further comprising a further insulating element which encloses the inner container, said further insulating element comprising a copper layer which faces the thermal shield and a multilayer insulating layer arranged between the copper layer and the inner container, said insulating layer comprises multiple alternately arranged layers of a reflective film and a spacer.

19. The transport container according to claim 2, wherein the transport container has a plurality of second cooling lines and at least one of said plurality of second cooling lines is in direct fluid communication with the phase separator and at least another of said plurality of said second cooling lines is in direct fluid communication with the coolant container.

20. The transport container according to claim 4, wherein said transport container has a plurality of second cooling lines and the insulating element has at least a first and a second heat conducting film, and wherein one of said plurality of second cooling lines is connected to the first heat conducting film in a thermally conducting manner, another of said second cooling lines is connected to the second heat conducting film in a thermally conducting manner, and multiple layers of the reflective film and spacer are positioned between the first and second heat conducting films.

* * * * *